US012799341B2

(12) United States Patent
Lazar et al.

(10) Patent No.: US 12,799,341 B2
(45) Date of Patent: Nov. 17, 2026

(54) CURABLE COMPOSITION FOR PRODUCTION OF COATINGS FOR THERMAL, ELECTRICAL AND/OR ACOUSTIC INSULATION

(71) Applicant: Evonik Operations GmbH, Essen (DE)

(72) Inventors: Björn Lazar, Hasselroth (DE); Bettina Gerharz-Kalte, Huenfelden (DE); Sara Liebana Viñas, Recklinghausen (DE); Alexander Lygin, Griesheim (DE)

(73) Assignee: Evonik Operations GmbH, Essen (DE)

( * ) Notice: Subject to any disclaimer, the term of this patent is extended or adjusted under 35 U.S.C. 154(b) by 474 days.

(21) Appl. No.: 18/509,122

(22) Filed: Nov. 14, 2023

(65) Prior Publication Data

US 2024/0158649 A1 May 16, 2024

(30) Foreign Application Priority Data

Nov. 15, 2022 (EP) .................................... 22207499

(51) Int. Cl.
*C09D 7/62* (2018.01)
*C09D 7/40* (2018.01)

(52) U.S. Cl.
CPC ................ *C09D 7/62* (2018.01); *C09D 7/67* (2018.01); *C09D 7/68* (2018.01)

(58) Field of Classification Search
CPC ... C09D 7/62; C09D 7/67; C09D 7/68; C09D 5/02; C09D 5/34; C09D 5/00; C09D 133/00; C09D 7/61; C09D 11/03; C09D 11/38; C09D 201/00; C04B 2111/00482; C04B 20/1051; C04B 26/02; C04B 26/08;
(Continued)

(56) References Cited

U.S. PATENT DOCUMENTS

| | | | |
|---|---|---|---|
| 5,776,240 | A | 7/1998 | Deller et al. |
| 2007/0173154 | A1 | 7/2007 | Hartmann et al. |

(Continued)

FOREIGN PATENT DOCUMENTS

| | | |
|---|---|---|
| DE | 10 2008 043 825 | 5/2010 |
| DE | 10 2015 216505 | 3/2017 |

(Continued)

OTHER PUBLICATIONS

European Search Report received for European Patent Application No. 22207499.9, mailed on Apr. 5, 2023, 12 pages.

*Primary Examiner* — Pamela H Weiss
(74) *Attorney, Agent, or Firm* — Grüneberg Global IP, PLLC

(57) ABSTRACT

A curable composition for production of coatings for thermal, electrical and/or acoustic insulation, where the composition has at least one aqueous binder can be made. The composition has a first component based on spray-dried fumed silica pellets. The composition also has at least one second component selected from the group of the silicon dioxides, preferably microsilica, pellets based on pyrogenically produced silicon dioxide, silica aerogels, silicate glass (foamed glass/expanded glass), hollow silicon dioxide particles (hollow glass beads), or pellets selected from perlites, preferably expanded perlites, vermiculites, polymers, preferably expanded polystyrene pellets, and mixtures thereof.

18 Claims, 5 Drawing Sheets

(58) Field of Classification Search

CPC . C04B 28/26; C04B 2111/28; C04B 2111/52; C04B 2111/92; C04B 14/24; C04B 14/062; C04B 14/064; C04B 14/066; C04B 14/185; C04B 14/204; C04B 16/08; C04B 20/008; C04B 40/065; C04B 2103/54; C04B 14/46; C04B 2103/32; C08K 3/013; C08K 3/36; C08K 7/22; C08K 7/28; C08K 7/26; C08K 9/06; C08K 9/08

See application file for complete search history.

(56) References Cited

U.S. PATENT DOCUMENTS

| | | | | |
|---|---|---|---|---|
| 2008/0272005 | A1* | 11/2008 | Tazzia | C09D 17/002 205/317 |
| 2010/0221545 | A1 | 9/2010 | Abe | |
| 2011/0236586 | A1 | 9/2011 | Bauer et al. | |
| 2016/0084140 | A1* | 3/2016 | Dietz | D04H 1/587 427/372.2 |
| 2020/0031720 | A1 | 1/2020 | Geisler et al. | |
| 2020/0308051 | A2 | 10/2020 | Jantke et al. | |

FOREIGN PATENT DOCUMENTS

| | | | | |
|---|---|---|---|---|
| EP | 0 725 037 | | 8/1996 | |
| EP | 1700824 | A1 * | 9/2006 | C09C 1/3036 |
| EP | 2 774 963 | | 9/2014 | |
| WO | 2006/097668 | | 9/2006 | |
| WO | 2011/076518 | | 6/2011 | |
| WO | 2017/036744 | | 3/2017 | |
| WO | 2018/134275 | | 7/2018 | |
| WO | 2021/144170 | | 7/2021 | |
| WO | WO-2021144170 | A1 * | 7/2021 | C09C 1/28 |

* cited by examiner

CURABLE COMPOSITION FOR PRODUCTION OF COATINGS FOR THERMAL, ELECTRICAL AND/OR ACOUSTIC INSULATION

CROSS-REFERENCE TO RELATED APPLICATIONS

This application claims priority to European Application No. 22207499.9 filed on Nov. 15, 2022, the content of which is hereby incorporated by reference in its entirety.

BACKGROUND OF THE INVENTION

Field of the Invention

The invention relates to a curable composition for production of coatings for thermal, electrical and/or acoustic insulation, to the production and use thereof, and to the coatings produced therefrom.

Description of Related Art

Coatings are applied to surfaces or substrates for decorative, functional or protective purposes. They decorate, protect and preserve materials such as wood, metal or plastic. Accordingly, bright and glossy coat layers are required on the one hand, and a continuous coat layer on the other hand for assurance of chemical and mechanical stability, a certain glide over the coatings or a particular feel. The demand for surface protection is continually increasing in different sectors of industry, such as aerospace, automotive, rail vehicle, shipbuilding, construction and wind energy.

A thermal insulation coating is frequently used for prevention of heat transfer and for energy saving. There are two kinds of thermal insulation coatings: 1) a thermal insulation coating based on the principle of heat reflection; and 2) a thermal insulation coating based on the insulating effect of a coating having low thermal conductivity.

A heat-reflective layer is normally used in order to prevent the heat generated by radiation. In this case, for example, heat-reflective paints are used for buildings. The colour helps to reflect sunlight in order to reduce the insolation on buildings. The thermal insulation coating based on the insulating effect of a coating is intended for applications that require reduction or prevention of heat transfer.

Low heat transfer coefficients are possessed by porous thermal insulation materials, for instance aerogels or fumed or precipitated silicas. Fumed silicas are produced via flame hydrolysis of volatile silicon compounds, for example organic and inorganic chlorosilanes, in a hydrogen and oxygen flame.

Silica and silicon dioxide will be used as synonyms in the present invention.

WO 2006/097668 A1 describes fibre-free microporous thermal insulation material pellets comprising fumed silicon dioxide pellets and an opacifier having a particle size of 0.25 mm-2.5 mm.

WO2018/134275 discloses a granular material based on fumed silicon dioxide and an IR opacifier having improved mechanical stability, which is produced after a thermal treatment at 950° C. The material shows excellent heat-insulating action, but the pellets have an irregular particle shape and a broad particle size distribution.

WO2017036744A1 describes shaped silica bodies with low C content, low density, high pore volume and low thermal conductivity, where the shaped body is either formed from a moist mixture containing silica, a binder and an organic solvent by evaporating the solvent or by compressing a mixture containing silica and a binder. The silica pellets have irregular shapes and particle sizes.

WO 2021/144170 describes a hydrophobic granular silica-based material having elevated polarity, wherein the pelletized material has a median particle diameter ($d_{50}$) of >200 μm.

However, these pelletized materials known from the prior art have a tendency to increase the viscosity in a curable coating composition, which can lead to poor flow properties. Application can thus be made more difficult, and can result in the complete rejection of the composition.

Furthermore, the surface of the coatings produced with the known pelletized materials does not have nice tactile properties. The surface does not have a smooth and uniform appearance, which can have an adverse effect not just on the aesthetic properties of such coatings, but possibly also on the functional effect.

SUMMARY OF THE INVENTION

It is therefore an object of the present invention to provide a curable composition for production of coatings for thermal, electrical and/or acoustic insulation that has improved storage stability, and coatings produced therefrom have at least good or improved heat-insulating action. It is likewise desirable to obtain a coating having an improved surface appearance.

In order to achieve the object, a curable composition of the type specified at the outset is proposed, comprising at least one aqueous binder, a first component based on spray-dried fumed silica pellets and at least one second component selected from the group of the silicon dioxides, preferably microsilica, pellets based on pyrogenically produced silicon dioxide, silica aerogels, silicate glass (foamed glass/expanded glass), hollow silicon dioxide particles (hollow glass beads), or pellets selected from the group of the perlites, preferably expanded perlites, from the group of the vermiculites and from the group of polymers, preferably expanded polystyrene pellets, and mixtures thereof.

Surprisingly, the coatings that have been produced with the curable composition according to the invention have good heat-insulating action.

The rheological characteristics of the coating composition are particularly important for the achievement of the desired application properties. Therefore, the establishment of a rheology profile of the composition is particularly important. This rheology profile is defined by the application method to be employed (e.g. spraying, rolling, roll coating, pouring, painting of printing methods), and is ensured by the choice of formulation.

In general, the rheology profile is measured over a wide shear rate range. It is known that a high shear rate is reflective, for example, of the tendency to spray or brush resistance, and formation of spray mist, and a low shear rate is reflective, for example, of running characteristics and paint finish.

However, the rheology profile established beforehand frequently changes during storage, such that the composition is no longer suitable for a particular application method.

This variance of the rheology profile is quantified by measurement of the viscosity of a coating composition at particular shear rates before and after storage. In the paints industry, viscosity values before (for example one day after production of the coating composition) and after storage (for example one week after production of the coating composition) at shear rates of 50 rpm (revolutions per minute), after 0 seconds, 30 seconds and 60 seconds, are typically employed in order to make a statement as to the application properties of the coating composition.

The compositions according to the invention are preferably preparations for various fields of application that are applied to the substrate to be coated by application methods such as, for example, spraying, dipping, rolling, pouring or painting application, and various printing methods.

It has been found that, unexpectedly, the curable composition according to the invention has improved storage stability compared to compositions comprising pelletized materials known from the prior art.

DETAILED DESCRIPTION OF THE INVENTION

First Component

Figure 1:
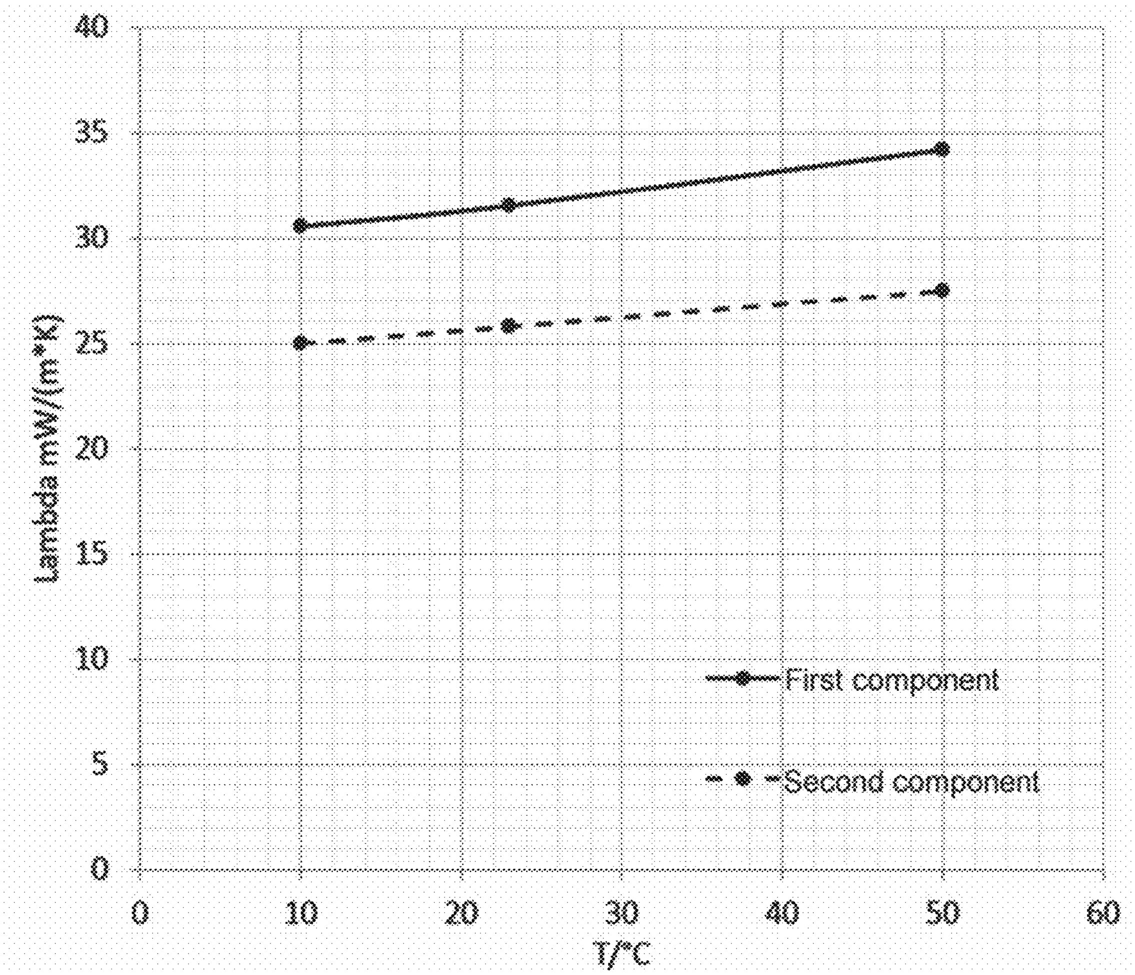
FIG. 1 shows the respective thermal conductivity of the two components.

The first component preferably has the following physicochemical indices:

- median particle diameter ($d_{50}$): 10 to 200 μm,
- BET surface area: 20 to 600 $m^2/g$
- tamped density: 250-700 g/l, obtainable by spray drying an aqueous pyrogenically produced silicon dioxide.

The prior art discloses pelletized materials of this kind as the first component. Numerous synthesis methods are known to the person skilled in the art, for example from the teaching of EP 0 725 037 A1. These pelletized materials have found use to date as catalyst supports. They are not of interest as heat-insulating material because of their relatively high tamped density.

In the present invention, the term "pelletized material" is understood to mean a grainy, readily pourable, free-flowing solid material.

Tamped densities of various pulverulent or coarse-grain granular materials can be determined according to DIN ISO 787-11:1995 "General methods of test for pigments and extenders—Part 11: Determination of tamped volume and apparent density after tamping". This involves measuring the bulk density of a bulk material after agitation and tamping.

A median particle size of the pelletized material of the invention can be determined according to ISO 13320:2009 by laser diffraction particle size analysis. The resulting measured particle size distribution is used to define the median $d_{50}$, which reflects the particle size not exceeded by 50% of all particles, as the average particle size.

The pelletized material according to the invention may have a BET surface area of 20 to 600 $m^2/g$, more preferably of 50 to 400 $m^2/g$, most preferably of 70 to 350 $m^2/g$. The specific surface area, also referred to simply as BET surface area, is determined according to DIN 9277:2014 by nitrogen adsorption in accordance with the Brunauer-Emmett-Teller method.

The first component preferably has a pore volume of 0.5-2.5 ml/g (d<4 μm), determined by Hg porosimeter.

The determination of the Hg pore volume (d<4 μm) is based on mercury intrusion according to DIN 66133, and an AutoPore V 9600 instrument from Micromeritics is used. The process principle is based on the measurement of the mercury volume injected into a porous solid as a function of the pressure applied.

The first component preferably has a particle size distribution ($d_{90}$-$d_{10}$/$d_{50}$) between 0.6-2.5, preferably 0.8-2.0.

The first component may preferably have been surface-modified with a surface modifier selected from the group of the organosilanes, silazanes, acyclic polysiloxanes, cyclic polysiloxanes, or mixtures thereof.

Second Component

The composition according to the invention comprises a second component selected from the group consisting of silicon dioxides, preferably microsilica, pellets based on pyrogenically produced silicon dioxide, silica aerogels, silicate glass (foamed glass/expanded glass), hollow silicon dioxide particles (hollow glass beads), or pellets selected from the group of the perlites, preferably expanded perlites, from the group of the vermiculites and from the group of polymers, preferably expanded polystyrene pellets, and mixtures thereof.

The pellets preferably have a median particle size with $d_{50}$ of 1 μm to 2 mm.

In general, it is possible to use standard commercial products as the second component. Some of these are as follows: standard commercial silicate glass particles are, for example, Poraver® from Poraver GmbH; known perlites are, for example, Tri-Spheres® 350 and Tri-Spheres® 400S from Lehmann & Voss & Co. KG; Enova® Aerogel IC3100, IC3110 and IC3120 from Cabot Corporation.

Silicon dioxide may include one or more commonly known types of silicas, such as the so-called aerogels, xerogels, perlites, precipitated silicas, fumed silicas.

The composition according to the invention preferably comprises a second component preferably selected from the group of pellets based on pyrogenically produced silicon dioxide, where this differs from the first component in at least one physicochemical index.

Fumed silicas are produced by means of flame hydrolysis or flame oxidation. This involves oxidizing or hydrolysing hydrolysable or oxidizable starting materials, generally in a hydrogen/oxygen flame. Starting materials that may be used for pyrogenic methods include organic and inorganic substances. Silicon tetrachloride is particularly suitable. The hydrophilic silica thus obtained is amorphous. Fumed silicas are generally in aggregated form. "Aggregated" shall be understood to mean that what are called primary particles formed at first during generation make strong interconnections in the further course of the reaction to form a three-dimensional network. The primary particles are very substantially free of pores and have free hydroxyl groups on their surface.

The prior art discloses such fumed silica pellets. Numerous synthesis methods are known to the person skilled in the art, for example from the teaching of WO2021/144170.

Such fumed silica pellets preferably have a tamped density of 80 g/l-250 g/l, preferably 100 g/l-250 g/l.

Such fumed silica pellets preferably have a median particle diameter ($d_{50}$) of >200 μm, preferably 250 μm-1000 μm.

Such fumed silica pellets preferably have a pore volume of 2.0-4.0 ml/g (d<4 μm), determined by Hg porosimeter.

The composition according to the invention contains hydrophobized pellets based on fumed silicon dioxide particles. The term "hydrophobic" in the context of the present invention relates to the particles having a low affinity for polar media such as water. The hydrophilic particles, by contrast, have a high affinity for polar media such as water. The hydrophobicity of the hydrophobic materials can typically be achieved by the application of appropriate nonpolar groups to the silica surface. The extent of the hydrophobicity of a hydrophobic silica can be determined via parameters including its methanol wettability, as described in detail, for example, in WO2011/076518 A1, pages 5-6. In pure water, a hydrophobic silica separates completely from the water and floats on the surface thereof without being wetted with the solvent. In pure methanol, by contrast, a hydrophobic silica is distributed throughout the solvent volume; complete wetting takes place. Measurement of methanol wettability determines a maximum content of methanol in a methanol-water test mixture at which wetting of the silica still does not take place, i.e. after contact with the test mixture 100% of the employed silica remains unwetted and separates from the test mixture. This content of methanol in the methanol-water mixture in steps of 5% by volume is called methanol wettability. The higher such a methanol wettability, the more hydrophobic the silica. The lower the methanol wettability, the lower the hydrophobicity and the higher the hydrophilicity of the material.

The methanol wettability of the second component selected from the group of the pellets based on pyrogenically produced silicon dioxide is preferably greater than 50% by volume of methanol, more preferably >55% by volume of methanol.

The methanol wettability of the first component is preferably greater than 50% by volume of methanol.

The carbon content of the second component selected from the group of the pellets based on pyrogenically produced silicon dioxide is preferably 0.5% by weight-10% by weight.

The second component may preferably have been surface-modified with a surface modifier selected from the group of the organosilanes, silazanes, acyclic polysiloxanes, cyclic polysiloxanes, or mixtures thereof.

The carbon content of the first component is preferably 0.5% by weight-10% by weight.

Preferably, the weight ratio of the first component to the second component is from 1:10 to 10:1, preferably 1:8 to 8:1, more preferably 1:4 to 4:1.

The composition according to the invention preferably includes a binder selected from the group consisting of (meth)acrylates, alkyd resins, epoxy resins, gum arabic, casein, vegetable oils, polyurethanes, silicone resins, organomodified silicone hybrid resins, wax, polyesters, vinyl resins, cellulose derivatives, silica sol, waterglass and mixtures thereof.

The composition according to the invention optionally preferably further comprises film formers, pigments, fillers, thickeners, fibres, dispersants, wetting agents, preservatives, emulsifiers, protective colloids and/or defoamers.

The invention further provides a process for producing a curable composition suitable for production of coatings for thermal or acoustic insulation, in which a mixture is produced that comprises

- at least one aqueous binder,
- a first component based on spray-dried fumed silica pellets,
- at least one second component selected from the group of the silicon dioxides, preferably microsilica, pellets based on pyrogenically produced silicon dioxide, silica aerogels, silicate glass (foamed glass/expanded glass), hollow silicon dioxide particles (hollow glass beads), or pellets selected from the group of the perlites, preferably expanded perlites, from the group of the vermiculites and from the group of polymers, preferably expanded polystyrene pellets, and mixtures thereof,
- the following may optionally be added subsequently to the mixture: film formers, pigments, fillers, thickeners, fibres, protective colloids, dispersants, wetting agents, preservatives and/or defoamers.

It may be advantageous when the first component is mixed into the aqueous binder before the second component.

The process according to the invention can be performed in a mixing apparatus for example. A suitable mixing apparatus of this kind for production of the composition according to the invention is any apparatus capable of enabling simple and gentle incorporation of the pulverulent or granular silicon dioxide with the aqueous phase. Stirrers are typically used for this purpose in the coatings industry, the relatively simple construction of which enables a low-maintenance and easily cleaned mode of production.

The process of the present invention is preferably performed at a stirrer speed of more than 200 rpm (revolutions per minute), preferably of 400 to 5000 rpm, especially preferably of 600 to 3000 rpm.

The first component used for the process according to the invention can preferably be spray-dried fumed silicon dioxide pellets having the above-described physicochemical indices.

The second component used for the process according to the invention can preferably be pellets based on pyrogenically produced silicon dioxide having the above-described physicochemical indices.

For the process according to the invention, the weight ratio of the first component to the second component is 1:10 to 10:1, preferably 1:8 to 8:1, more preferably 1:4 to 4:1.

The invention also provides for the use of the first component as additives in compositions for production of coatings for thermal, electrical or acoustic insulation. It has been shown for the first time that, surprisingly, the inventive use of the first component is suitable for the production of coatings for thermal, electrical and/or acoustic insulation having a smooth coating surface, which is likely to be of interest for some fields of application.

Also in accordance with the invention, accordingly, are coatings, varnishes, paints, inks, coverings, sealants and adhesives obtainable through use of the composition according to the invention.

Completely surprisingly, it has been found that the combination of the two components, where the second component differs from the first component in at least one physicochemical index, shows synergistic effects, for instance better storage stability of the composition according to the invention and/or improved thermal, electrical and/or acoustic insulation of the coating produced therefrom. Moreover, the coating surface has smooth tactile properties.

In addition, a further technical effect has unexpectedly been shown in the examples. This is because it is possible for the composition according to the invention to have a higher loading of pellets in order to further lower the thermal conductivity of the coating produced with the curable composition according to the invention without significantly reducing the storage stability of the composition according to the invention.

Furthermore, the invention enables flexible usability, entirely according to the user's requirements. For instance, it is conceivable that the key factor is not always the highest thermal, electrical and/or acoustic insulation, but rather also the visual appearance of the coating. The user can, for example, set or adjust these properties as desired.

The examples which follow serve merely to elucidate this invention to those skilled in the art and do not constitute any limitation of the described use whatsoever.

Methods

Tamped density [g/l] was determined to DIN ISO 787-11:1995.

Specific BET surface area [$m^2/g$] was determined to DIN 9277:2014 by nitrogen adsorption by the Brunauer-Emmett-Teller method.

Methanol wettability [% by volume of methanol in methanol/water mixture] was determined by a method described in WO2011/076518 A1, pages 5-6.

Carbon content [% by weight] was determined to EN ISO3262-20:2000 (Chapter 8) by elemental analysis with the C632 carbon determination system (manufacturer: LECO). The sample analysed was weighed into a ceramic crucible, admixed with combustion additives and heated under an oxygen stream in an induction oven. The carbon present is oxidized to CO2. The amount of CO2 gas is quantified by infrared detectors (IR). SiC, if present, is not combusted and therefore does not affect the carbon content value.

Determination of Hg pore volume (d<4 μm) is based on mercury intrusion according to DIN 66133, and an AutoPore V 9600 instrument from Micromeritics is used. The process principle is based on the measurement of the mercury volume injected into a porous solid as a function of the pressure applied.

Thermal conductivity [in mW/(m*K)] was measured to EN 12667:2001 by the Guarded Hot Plate (GHP) method.

The viscosity of the composition was determined with the Brookfield DV2T Extra rotary viscometer. The spindles and speed were selected in accordance with the viscosity range specified in the handbook. (industry standard)

Application

The compositions according to the invention and comparative composition were applied to 15 cm×15 cm×0.3 cm commercial aluminium sheets with the aid of a spray gun within 24 hours after production. The layer thickness of each spraying operation is between 1-2 mm depending on fill level and viscosity.

They were subsequently dried at room temperature for about 24 hours, and the residual moisture was removed at 60° C. in an oven with daily monitoring of weight loss. When the weight was constant between 2 weighings, the drying operation was stopped; this generally takes not more than 1 week.

The cured coated aluminium sheets are used for visual assessment. For the determination of thermal conductivity, layer thicknesses exceeding 1 cm are needed. For this purpose, the sheets are repeatedly sprayed and dried. The surface of the coating is machined parallel to the plane of the underside of the aluminium sheet for contacting in the measurement device.

Visual Assessment of the Coating Surface

For the visual assessment of the coating surface, images were created.

EXAMPLES

1. Determination of the Thermal Conductivity of the First and Second Components 1.1 First Component Spray-dried fumed silica pellets were produced according to Example 8 of EP 0 725 037.

1.2 Second Component

Pellets based on fumed silicon dioxide according to Example 2 of WO 2021/144170 were produced.

FIG. 1 shows the respective thermal conductivity of the two components. The second component has lower thermal conductivity than the first component and therefore has better heat-insulating capacity. The person skilled in the art is aware that the first component has been used as catalyst support.

2. Determination of Change in Viscosity During Storage

The inventive compositions Z1, Z2, Z3 and Z4 and the comparative composition VZ1 were produced according to the details from Table 1. The comparative example used was the second component since it has higher heat-insulating capacity than the first component (see FIG. 1).

The compositions were created as follows: In the first step, the fibres, Kelco-vis and water were mixed vigorously in a standard laboratory mixing apparatus consisting of stirred vessel and laboratory stirrer system with propeller stirrer. It is advisable here to make up a preliminary mixture for multiple experiments and to take the amount for each batch therefrom according to Table 1. Subsequently, the binder was added, and this was mixed with the preliminary mixture. In the last step, the pellets were added stepwise, preferably commencing with the first component. The stirrer speed was increased with increasing particle loading, such that there was always a vortex formed for gentle but vigorous mixing. A maximum of 1200 rpm was used at maximum loading.

TABLE 1

| Compositions in % by wt. | | | | | |
|---|---|---|---|---|---|
| | VZ1 | Z1 | Z2 | Z3 | Z4 |
| Mowilith ® LDM 6119 binder, from Celanese Corporation | 48.54 | 48.54 | 48.54 | 48.54 | 47.36 |
| Water | 25.01 | 25.01 | 25.01 | 25.01 | 24.4 |
| First component | 0.0 | 2.57 | 5.15 | 7.72 | 5.51 |
| Second component | 25.74 | 23.17 | 20.59 | 18.02 | 22.03 |
| Lapinus CF50 fibres, from Rockwool | 0.66 | 0.66 | 0.66 | 0.66 | 0.65 |
| Kelco-vis DG Biopolymer, from CP Kelco US Inc. | 0.05 | 0.05 | 0.05 | 0.05 | 0.05 |

The viscosity of the compositions produced was determined over 46 days. The samples were sealed airtight between the measurements and stored in an oven at 50° C. in order to simulate accelerated ageing of the samples. The results are shown in a graph in FIG. 2.

Figure 2:
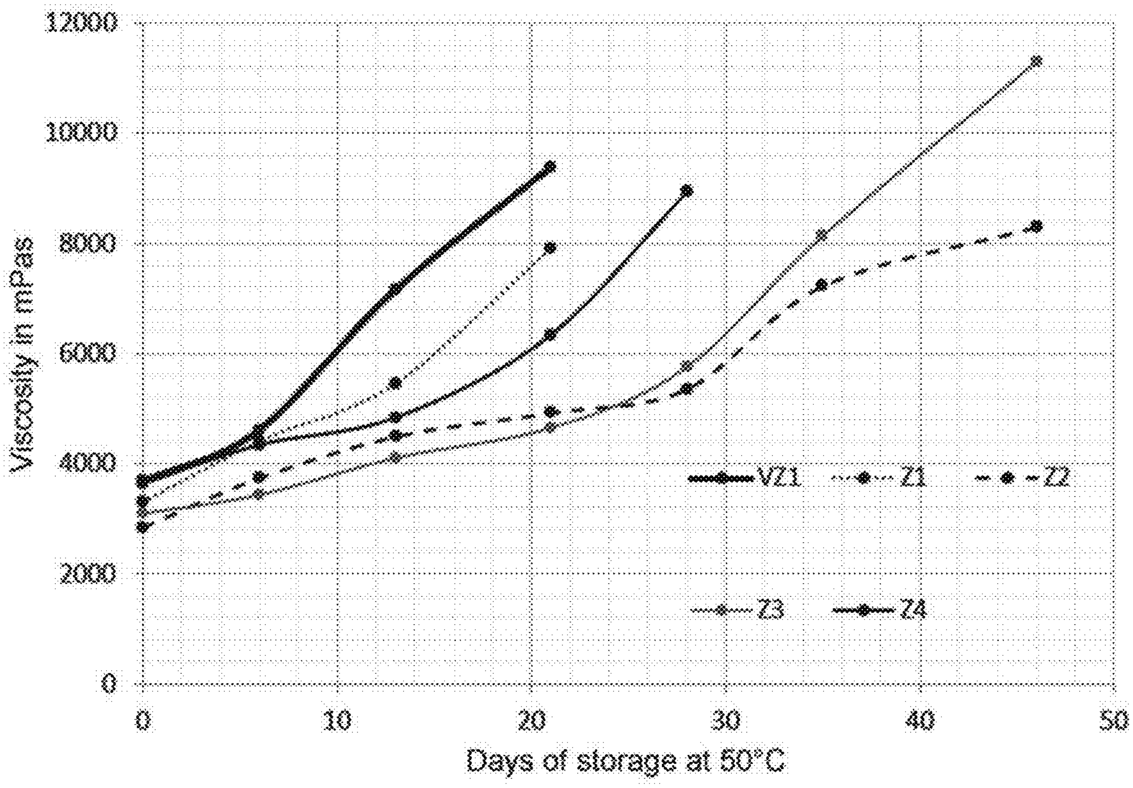
FIG. 2 shows that all viscosities of the compositions according to the invention evolve toward higher values that would no longer permit spray coating, for example, only after prolonged storage.

FIG. 2 shows that all viscosities of the compositions according to the invention evolve toward higher values that would no longer permit spray coating, for example, only after prolonged storage. For example, 8000 mPa*s is attained for these compositions only between 21-42 days.

By contrast, VZ1 shows an increase in viscosity to 8000 mPa*s after only about 16 days.

3. Determination of Thermal Conductivity of the Coatings According to the Invention According to the details from Table 2, inventive composition Z5 and comparative composition VZ2 were produced and prepared for determination of thermal conductivity; see Application.

In both cases, the maximum loading of the compositions with pellets was such that spray coating was still possible. It was found that the combination of the two components in Z5, with a total of 32.51% by weight, permitted a higher proportion of pellets than the comparative composition VZ2 with only 28.65% by weight.

TABLE 2

| Compositions in % by wt. | | |
|---|---|---|
| | Z5 | VZ2 |
| Mowilith LDM 6119, from Celanese Corp. | 43.11 | 45.58 |
| Kelco-vis DG Biopolymer, from CP Kelco US Inc. | 0.04 | 0.04 |
| Water | 23.76 | 25.12 |
| Lapinus CF50 fibres, from Rockwool | 0.58 | 0.61 |
| Second component | 26.01 | 28.65 |
| First component | 6.5 | 0.0 |

It has been found that, unexpectedly, the inventive coating made from composition Z5, after drying at an average measurement temperature of 23° C. has lower thermal conductivity at a level of 44.4 mW/(m*K) than the comparative coating VZ2 at a level of 48.8 mW/(m*K), which leads to an improved heat-insulating effect.

4. Visual Assessment of the Coatings

Inventive compositions Z5, Z6 and comparative example VZ2 were produced according to Table 3, and applied and dried according to the specifications described above.

TABLE 3

| Compositions in % by wt. | | | |
|---|---|---|---|
| | Z5 | Z6 | VZ2 |
| Mowilith LDM 6119, from Celanese Corp. | 43.11 | 39.72 | 45.58 |
| Kelco-vis DG Biopolymer, from CP Kelco US Inc. | 0.04 | 0.04 | 0.04 |
| Water | 23.76 | 21.88 | 25.12 |
| Lapinus CF50 fibres, from Rockwool | 0.58 | 0.53 | 0.61 |
| Second component | 26.01 | 0.0 | 28.65 |
| First component | 6.5 | 37.83 | 0.0 |

Figure 3:
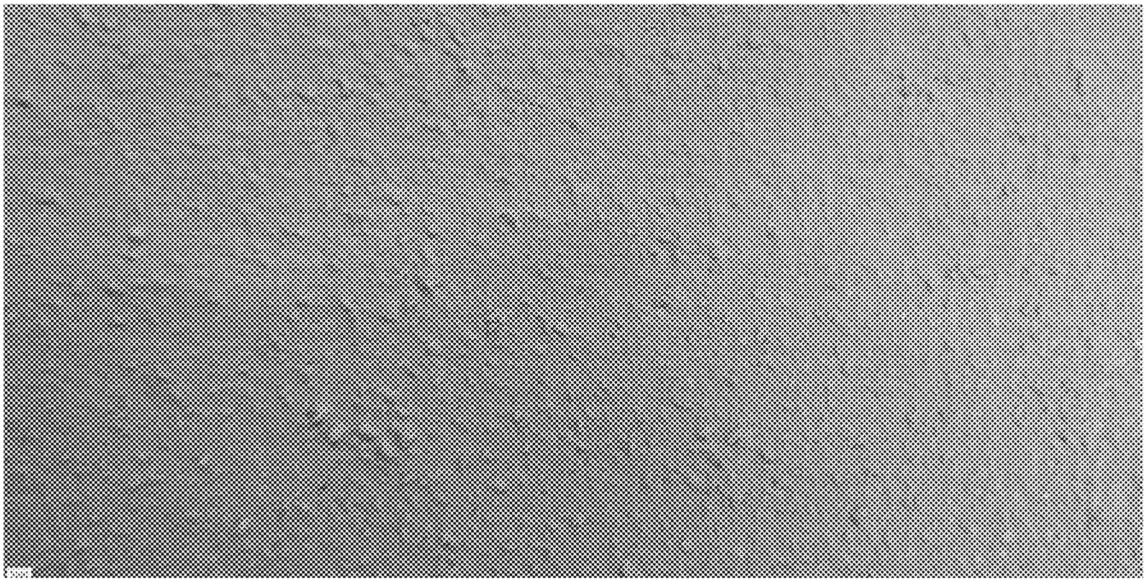
FIG. 3 shows an image of the coating surface of VZ2.
Figure 4:
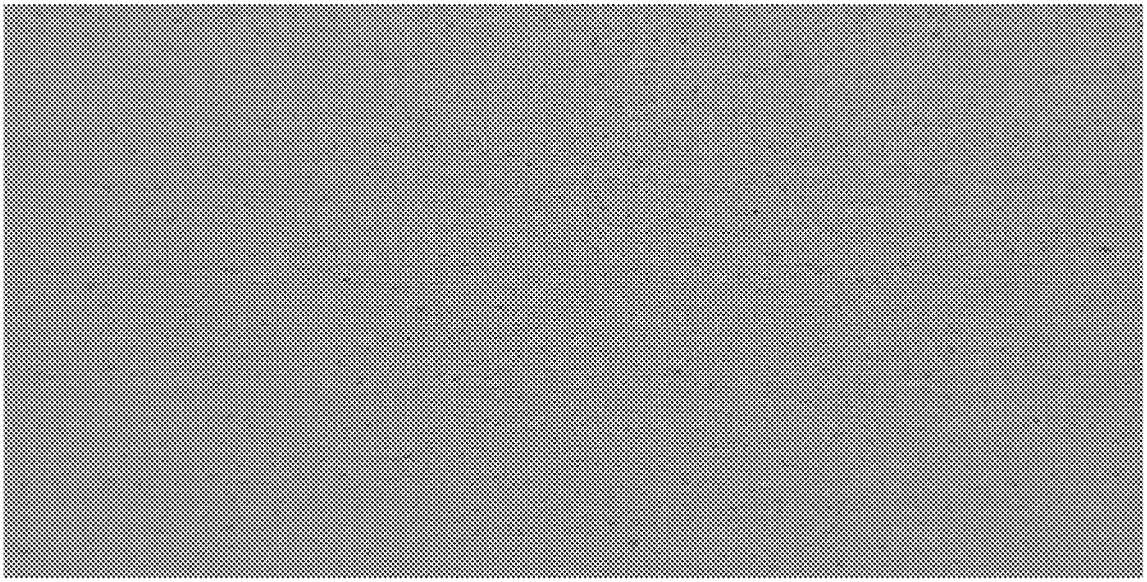
FIG. 4 shows an image of the coating surface of Z5.
Figure 5:
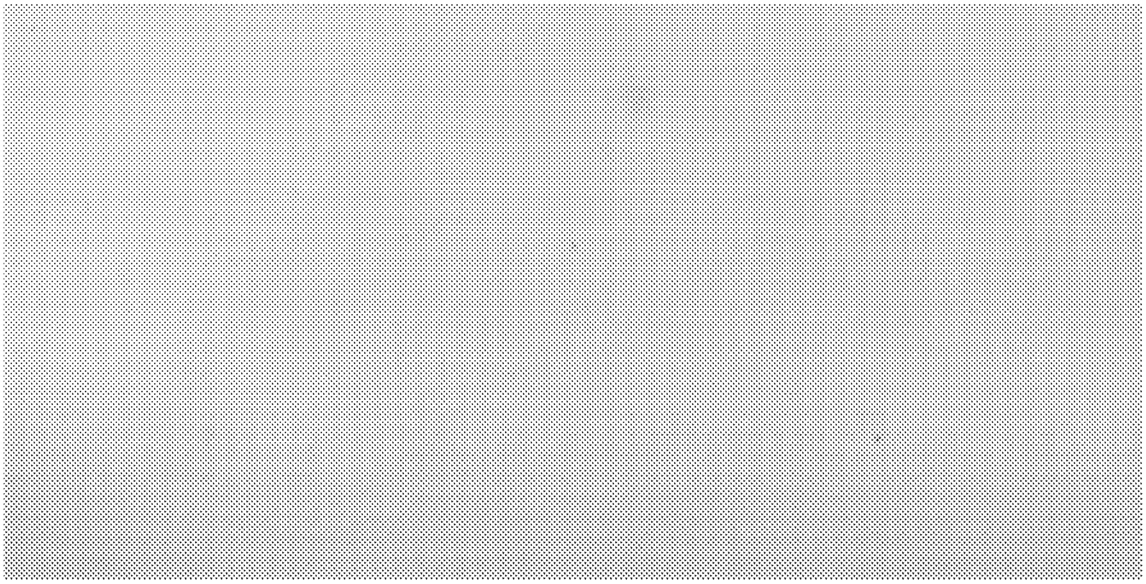
FIG. 5 shows an image of the coating surface of Z6.

FIG. 3 shows an image of the coating surface of VZ2.
FIG. 4 shows an image of the coating surface of Z5.
FIG. 5 shows an image of the coating surface of Z6.

The images show clearly that the very rough surface of VZ2 (FIG. 3) becomes much smoother through addition of the first component (Z5 in FIG. 4). Surfaces having exclusively the first component are very smooth and have barely any unevenness (Z6 in FIG. 5), the thermal conductivity of which was 51.5 mW/(m*K).

The invention claimed is:

1. A curable composition for production of coatings for thermal, electrical and/or acoustic insulation, comprising:
- at least one aqueous binder;
- a first component based on spray-dried fumed silicon dioxide pellets; and
- at least one second component which is at least one selected from the group consisting of silicon dioxides, pellets based on pyrogenically produced silicon dioxide, silica aerogels, silicate glass (foamed glass/expanded glass), hollow silicon dioxide particles (hollow glass beads), perlite pellets, vermiculite pellets, polymers, and mixtures thereof;
- wherein the first component has the following physicochemical indices:
- a median particle diameter ($d_{50}$) in a range of 10 to 200 μm,
- a BET surface area in a range of 20 to 600 $m^2/g$; and
- a tamped density in a range of 250-700 g/l, obtainable by spray drying an aqueous pyrogenically produced silicon dioxide;
- wherein the first component has a pore volume in the range of 0.5-2.5 ml/g (d<4 pm), determined by Hg porosimeter; and
- wherein (d<4 pm), determined by Hg porosimeter; and
- wherein the first component has a particle size distribution in a range ($d_{90}$-$d_{10}$/$d_{50}$) between 0.6-2.5.

2. The curable composition according to claim 1, wherein the first component has been surface-modified with a surface modifier selected from the group consisting of organosilanes, silazanes, acyclic polysiloxanes, cyclic polysiloxanes, and mixtures thereof.

3. The curable composition according to claim 1, wherein the at least one second component selected from the group of pellets based on pyrogenically produced silicon dioxide differs from the first component in at least one physicochemical index.

4. The curable composition according to claim 3, wherein the at least one second component selected from the group of pellets based on pyrogenically produced silicon dioxide has a tamped density in a range of 80 g/l-250 g/l.

5. The curable composition according to claim 3, wherein the pellets have a median particle diameter ($d_{50}$) of >200.

6. The curable composition according to claim 3, wherein the pellets have a pore volume of 2.0-4.0 ml/g (d<4 μm), determined by Hg porosimeter.

7. The curable composition according to claim 3, wherein a carbon content of the at least one second component selected from the group of pellets based on pyrogenically produced silicon dioxide is 0.5% by weight-10% by weight.

8. The curable composition according to claim 3, wherein a methanol wettability of the at least one second component selected from the group of pellets based on pyrogenically produced silicon dioxide is greater than 50% by volume of methanol.

9. The curable composition according to claim 1, wherein a carbon content of the first component is 0.5% by weight-10% by weight.

10. The curable composition according to claim 1, wherein a methanol wettability of the first component is greater than 50% by volume of methanol.

11. The curable composition according to claim 1, wherein a weight ratio of the first component to the at least one second component is from 1:10 to 10:1.

12. The curable composition according to claim 1, wherein the at least one aqueous binder is selected from the group consisting of (meth)acrylates, alkyd resins, epoxy resins, gum arabic, casein, vegetable oils, polyurethanes, silicone resins, organomodified silicone hybrid resins, wax, polyesters, vinyl resins, cellulose derivatives, silica sol, waterglass, and mixtures thereof.

13. The curable composition according to claim 1, wherein the curable composition comprises film formers, pigments, fillers, thickeners, fibres, dispersants, wetting agents, preservatives, emulsifiers, protective colloids, and/or defoamers.

14. A process for producing a curable composition suitable for production of coatings for thermal or acoustic insulation, the process comprising:

mixing at least one aqueous binder, a first component based on spray-dried fumed silica pellets, at least one second component selected from the group consisting of silicon dioxides, pellets based on pyrogenically produced silicon dioxide, silica aerogels, silicate glass (foamed glass/expanded glass), hollow silicon dioxide particles (hollow glass beads), perlite pellets, vermiculite pellets, polymers, and mixtures thereof, and the following may optionally be added subsequently to the mixture: film formers, pigments, fillers, thickeners, fibres, protective colloids, dispersants, wetting agents, preservatives, and/or defoamers;

wherein the first component has a median particle diameter ($d_{50}$) in a range of 10 to 200 μm, a BET surface area in a range of 20 to 600 $m^2/g$;

a tamped density in a range of 250-700 g/l, obtainable by spray drying an aqueous pyrogenically produced silicon dioxide;

a pore volume in a range of 0.5-2.5 ml/g (d<4 μm), determined by Hg porosimeter;

a particle size distribution in a range ($d_{90}$-$d_{10}$/$d_{50}$) between 0.6-2.5;

been surface-modified with a surface modifier selected from the group consisting of organosilanes, silazanes, acyclic polysiloxanes, cyclic polysiloxanes, and mixtures thereof;

a carbon content of the first component is 0.5% by weight-10% by weight; and a methanol wettability of the first component is greater than 50% by volume of methanol.

15. The process according to claim 14, wherein the at least one second component selected from the group of pellets based on pyrogenically produced silicon dioxide differs from the first component in at least one physicochemical index.

16. The process according to claim 14, wherein the weight ratio of the first component to the second component is from 1:10 to 10:1.

17. A method for the production of coatings for thermal, electrical, or acoustic insulation, the method comprising: applying a coating composition to a surface, wherein the first component according to claim 1 is an additive in the coating composition.

18. A coating, varnish, paint, ink, covering, sealant, or adhesive, comprising:

the composition according claim 1.

* * * * *